United States Patent [19]

Bertoti

[11] Patent Number: 5,101,571
[45] Date of Patent: Apr. 7, 1992

[54] HYDROSTATIC PLUMBER'S LEVEL

[76] Inventor: Albert Bertoti, 1002 NACO Hwy., #34, Bisbee, Ariz. 85603

[21] Appl. No.: 631,881

[22] Filed: Dec. 21, 1990

Related U.S. Application Data

[63] Continuation-in-part of Ser. No. 451,934, Dec. 18, 1989, abandoned.

[51] Int. Cl.⁵ .................................................. G01C 5/04
[52] U.S. Cl. ........................................................ 33/367
[58] Field of Search ............................................ 33/367

[56] References Cited

U.S. PATENT DOCUMENTS

| | | | |
|---|---|---|---|
| 872,183 | 11/1907 | Jenning | 33/367 |
| 1,060,602 | 5/1913 | Jenning | 33/367 |
| 2,557,021 | 6/1951 | Williams | |
| 2,587,998 | 3/1952 | Heath | |
| 2,804,692 | 9/1957 | Karstens | |
| 3,048,927 | 8/1962 | Maloof | 33/367 |
| 3,310,880 | 3/1967 | Watts | |
| 3,645,135 | 2/1972 | Hadley | |
| 3,815,423 | 6/1974 | Gearhart | |
| 3,835,548 | 9/1974 | Gearhart | |
| 4,106,342 | 8/1978 | Sormunen | |
| 4,379,367 | 4/1983 | Legris | |
| 4,384,410 | 5/1983 | Melugin | |
| 4,563,822 | 1/1986 | Legris | |
| 4,581,931 | 4/1986 | Robotti et al. | |
| 4,651,433 | 3/1987 | Mohr | |
| 4,759,134 | 7/1988 | Chrisley | |

FOREIGN PATENT DOCUMENTS

| | | | |
|---|---|---|---|
| 2739975 | 9/1978 | Fed. Rep. of Germany | |
| 2515337 | 10/1981 | France | |
| 2522137 | 8/1983 | France | 33/367 |
| 2542866 | 9/1984 | France | |
| 54-10409 | 7/1980 | Japan | |
| 1174747 | 8/1985 | U.S.S.R. | 33/367 |
| 1408221 | 7/1988 | U.S.S.R. | 33/367 |
| 8910536 | 11/1989 | World Int. Prop. O. | 33/367 |

*Primary Examiner*—Thomas B. Will
*Attorney, Agent, or Firm*—Grant L. Hubbard

[57] ABSTRACT

A vertical-difference measuring instrument comprising an entirely closed liquid system containing, as the only fluid, only substantially noncompressive liquid, the liquid system comprising a variable-volume reference reservoir and a sensing reservoir interconnected by a flexible hose, a flexible-walled gas container in the sensing reservoir and a pressure gauge connected in fluid communication with the flexible-walled gas container in the sensing reservoir for giving indication of the vertical distance between the reference reservoir and the sensing reservoir is disclosed.

9 Claims, 1 Drawing Sheet

HYDROSTATIC PLUMBER'S LEVEL

CROSS-REFERENCE TO RELATED APPLICATION

This is a continuation-in-part of U.S. application Ser. No. 07/451,934, filed Dec. 18, 1989, now abandoned to which priority is claimed.

BACKGROUND OF THE INVENTION

This invention relates to instruments for measuring vertical distances and for assuring that various components of a building structure are at the same level or at specified, predetermined differences in level.

In the construction industry it is often necessary to place a plurality of structures at the same level or at different levels at known and predetermined differences between the various levels. For example, in laying tile, positioning windows vertically, positioning wall panels vertically, and the like, it is necessary that all of the particular components be at exactly the same level or at precisely predetermined level differences.

There are various methods and apparatus used in ascertaining such levels. The conventional spirit level or bubble level may be used, but when large distances between the components are involved, this approach is difficult. In addition, when one starts at a given point on a long wall, particularly a wall with corners, it is possible to accumulate errors as one progresses along the wall and end up with a non-level panel, paint line, tile line, or the like.

Most often, these craftsmen measure from the floor or some other structure which is presumed, or at least hoped, to be level. While this is satisfactory some instances, it is not reliable in many structures.

The well-know surveyor's transit is unsuited to use by tile layers, plumbers, carpenters and others who work in confined spaces and often alone. These instruments require, for efficient use, two workmen and are expensive and cumbersome. In addition, one cannot assure that a tile line, for example, which extends into several room will be level because these rooms may not be visible from a given site.

Examples of prior art leveling devices are disclosed in the following patent documents:

Japanese Patent Application 54-10409, Hitratsuka, which discloses the use of a reflected light beam to measure the surface of a liquid in two tanks in which the liquid level is always the same.

Offenlegungsschrif 27 39 975, Wittmann, which discloses a device involving two hermetically sealed chambers with interconnected pressure sensors and a device for measuring differential pressure between the chambers.

French Patent 2,515,337, Legris, which discloses a complex solid state electronic system involving two mercury filled, sealed reservoirs sealed by stretched membranes with a semiconductor film on it.

French Patent 2,542,866, Legris, which discloses an exceedingly complex electromechanical system utilizing a reservoir closed by a membrane which closes a first space containing air which limits movements of the membrane. The first space is connected to a second space which is divided by a membrane which operates switches.

U.S. Pat. No. 2,557,021, Williams, discloses systems which require a closed loop between the bottom and top of the reservoir and the gauge, an artificially applied positive pressure, or a thermal insulator jacket.

U.S. Pat. No. 2,587,998, Heath, discloses a leveling device which has a reference reservoir which is open to the atmosphere, and hence subject to spillage or leakage at the reference point, and measuring tube which is also open to the atmosphere, which requires filling for use and emptying for transport or storage.

U.S. Pat. No. 2,804,692, Karstens, which discloses an electro-mechanical system involving a plurality of mercury filled chambers with floats on the mercury and plural electrical connections between the chambers.

U.S. Pat. No. 3,310,880, Watts, discloses a system using two manometers and a liquid system comprising a body of mercury and a body of less dense colored liquid.

U.S. Pat. No. 3,645,135, Hadley, discloses an electromechanical system utilizing a pair of cisterns with interconnected pools of mercury and a float on the mercury in each cistern which serves as a capacitor.

U.S. Pat. No. 3,815,423, Gearhart, discloses a ruggidized altimeter one or more diaphragms as the pressure sensing device, the diaphragms separating liquids and pressurized gasses, and error compensating structures of several types.

U.S. Pat. No. 3,835,548, Gearhart, discloses a leveling apparatus including a sight tube and a connecting liquid conduit to prevent spillage of liquid or entrapment of gases.

U.S. Pat. No. 4,106,342, Sormunen, discloses a barometric type device which uses two variable volume vessels, a pressure indicator for one vessel with temperature error compensation by means of a closed vessel acting upon the variable volume vessels.

U.S. Pat. No. 4,379,367, Legris, discloses a device relies upon a very dense liquid, e.g. mercury, and the stretching of diaphragms, membranes against the resisting force of the diaphragm material, whereas applicant relies upon a substantially non-resistant flexible bag which permits horizontal flow.

U.S. Pat. No. 4,384,410, Melugin et al, discloses a system including indicator heads connected by a liquid hose for equalizing static pressure in mercury pools and a gas hose for equalizing pressure within the heads above the mercury pools.

U.S. Pat. No. 4,563,822, Legris, discloses a masonry level which utilizes a chamber divided by a stretched diaphragm separating liquid in the lower part of the chamber and gas in the upper part of the chamber. The pressure of the liquid is reflected by the stretching of the diaphragm which compresses air which, in turn actuates a switch or indicator.

U.S. Pat. No. 4,581,931, Robotti et al, discloses a system for measuring differences in levels using plural reservoirs with floats in each, the float and an electrode forming a sensor for the level of liquid in the reservoir.

U.S. Pat. No. 4,651,433, Mohr, which discloses a system which uses pressure cells connected by flexible tubing and a strain gauge for sensing differential pressure, with various compensating devices such as a bellows to reduce hysteresis errors. In the Mohr device, accuracy depends upon exact identity of diaphragm structures and/or upon exact repetition of movement of such structures over the life of the instrument. Errors in flexing result in erroneous readings.

U.S. Pat. No. 4,759,134, Chrisley, discloses a devices which uses two flexible bags, but these are both filled with air, or gas, and neither serves as a reference reservoir. The bags of Chrisley are intended, apparently, only to permit the transmission of atmospheric pressure to the liquid column without permitting evaporation or contamination of the liquid.

Laser transits are even less suited to applications as described because of its great expense and the great amount of time required to set up the equipment.

There is a great and long-standing need for an inexpensive but accurate measuring and leveling device which will assure that components are exactly level with each other, vertically, or are at exactly predetermined differences in vertical position, as may be desired in particular instances. It is to a solution of this long-standing problem and meeting this serious need in the building and construction industries that the present invention is directed.

SUMMARY OF THE INVENTION

The present invention is a vertical-difference measuring instrument comprising an entirely closed liquid system containing, as the only fluid, only substantially non-compressive liquid. The system includes a variable-volume reference reservoir and a sensing reservoir interconnected by a flexible hose, a flexible-walled gas container in the sensing reservoir and a pressure gauge connected in fluid communication with the flexible-walled gas container in the sensing reservoir for giving a visible indication of the vertical distance between the reference reservoir and the sensing reservoir is disclosed.

As a leveling instrument for assuring that plural points on vertical surfaces in a building structure are at the same level, the invention comprises two basic structural assemblies. An entirely closed liquid system containing, as the only fluid, only substantially non-compressive liquid, the liquid system comprising a variable-liquid-volume reference reservoir, a sensing reservoir, and a flexible conduit having a first end and a second end for connecting said reservoirs in liquid communication with each other. The liquid-containing system also includes means connecting the reference reservoir at the first end of and in fluid communication with the flexible conduit means connecting the sensing reservoir at the second end of and in fluid communication with the flexible conduit, and liquid filling the flexible conduit. The instrument also includes a fluid-pressure gauge having a visible pressure indicator and indicia for giving a visual quantitative indication of the pressure applied to the gauge. Means are provided for connecting the fluid pressure gauge in fluid communication with the sensing reservoir. The fluid-pressure gauge and liquid-containing system are so connected, constructed and configured that the pressure measured by the pressure gauge is proportional to the vertical distance of the sensing reservoir above or below the reference reservoir. The leveling instrument includes indicia on the gauge, including a zero point and indicia indicating pressures above and below the zero point, and means may be provided for adjusting the indicator to the zero point regardless of the actual pressure applied to the pressure gauge. At the zero point, when so adjusted, the sensing reservoir is always at the same vertical elevation, even though moved from one wall to another or one room to another.

In a preferred embodiment, the means connecting the fluid-pressure gauge with the sensing reservoir for communicating the pressure in the sensing reservoir to the gauge comprises a flexible-walled gas container in the sensing reservoir. The pressure gauge is connected in fluid communication with the flexible-walled gas container thus transmitting the pressure in the sensing reservoir to the gauge. In this embodiment, the fluid-pressure gauge, flexible-walled gas container and liquid-containing system are so connected, constructed and configured that the pressure measured by the pressure gauge is the pressure of the gas in the gas container which is proportional to the vertical distance of the sensing reservoir above or below the reference reservoir.

The invention also serves as a vertical-difference measuring instrument comprising an entirely closed liquid system containing, as the only fluid, only substantially non-compressive liquid, the liquid system, in turn, comprising a variable-volume reference reservoir, a sensing reservoir, a flexible hose having one end connected in fluid communication with the reference reservoir and the other end connected in fluid communication with the sensing reservoir, a flexible-walled gas container in the sensing reservoir, a pressure gauge connected in fluid communication with the flexible-walled gas container in the sensing reservoir, the pressure gauge having a visible indicator, and liquid in the reference reservoir and hose and that portion of the sensing reservoir not occupied by the gas container, the reservoirs, hose, gas container and pressure gauge being so constructed and connected that the pressure gauge gives a visible indication of the pressure in the gas container which is proportional to the vertical distance between the reference reservoir and the sensing reservoir.

DESCRIPTION OF THE PREFERRED EMBODIMENTS

In the following description, reference will be made principally to the instrument as a leveling device, but as explained above, the instrument serves just as well for measuring different vertical distances. Also, the following description will use particular reference to convenient structural materials and particular structures, it being clearly understood that these are not limiting and that many alternatives to the various structures and embodiments described below may be used without departing from the spirit and scope of the invention.

Figure 1:
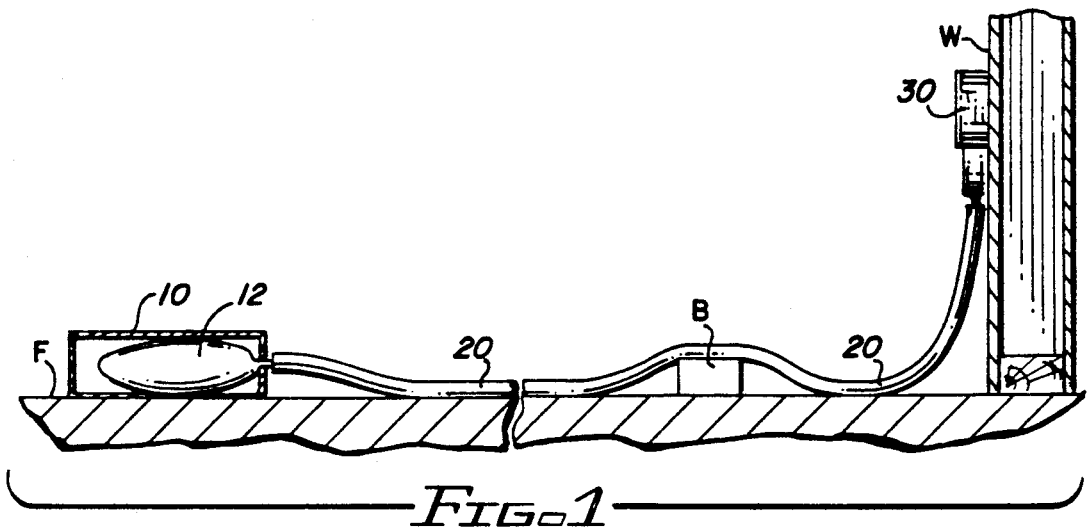
FIG. 1 is a side view in cross-section, largely schematic, showing the use of the leveling or measuring instrument of this invention in connection with a building structure comprising a floor and a wall.
Figure 2:
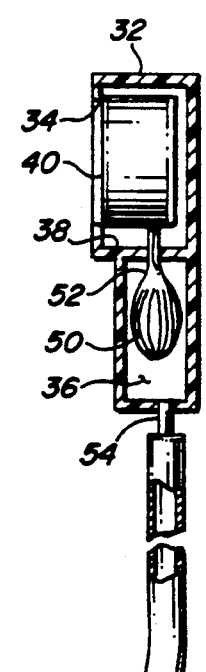
FIG. 2 is a schematic view shown in partial cross-section of the components and the interconnection of the components of this invention.
Figure 2:
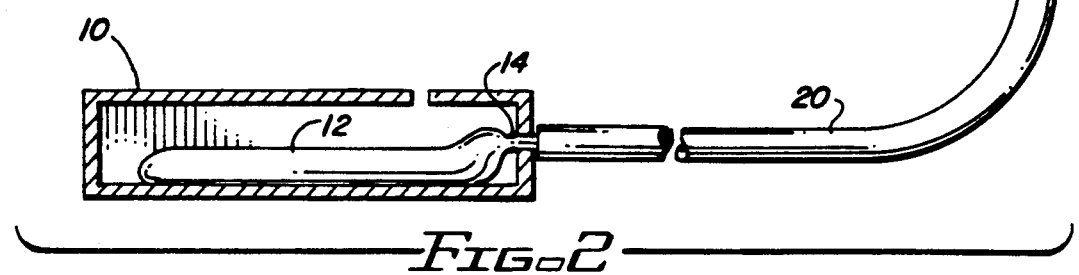

Referring first to FIG. 1 for an understanding of the use and general operation of the invention, the invention is shown in use in a building structure which comprises a floor F and a wall W. The invention conveniently comprises a case 10, although that certainly is not a necessary or an important part of the invention. The case 10, in the preferred embodiment, has a variable-volume reference reservoir 12 connected by means of a tube 14 in fluid communication with a hose 20. The reference reservoir 12 is a bag containing only liquid. The bag in a first configuration wherein the bag is not fully expanded to its maximum capacity, having the capability of expanding to a second configuration either by resilient or non-resilient stretching of the walls of the bag or by the unfolding or expanding of folds in the bag to a configuration having a greater volume than that of the first configuration. The bag is sufficiently large, in its full-capacity configuration, and is so incompletely filled with liquid that the bag will freely expand with negligible resistance, i.e. resistance so low as to be insignificant. For example, a practical plumber's level is satisfactory if it is accurate to one-tenth of and inch of water. The bag is sufficiently large to expand sufficiently to absorb the liquid forced by the change of volume in the gauge bourdon tube or other diaphragm through the conduit into the bag with a change in liquid level of no more than about one twentieth or less of an inch. Stated differently, the expansible volume of the bag with negligible resistance is at least equal to the maximum volume of liquid displaced by the gauge bourdon tube or diaphragm or other from its fully expanded configuration its fully compressed configuration. The bourdon tube is, of course, merely a special case of the more conventional pan-shaped diaphragm. The bag contains only liquid in all configurations, i.e. there is no gas in the bag. Obviously, small solid objects in the bag, while not desirable, may be tolerated. Terminology indicating the bag is incompletely filled with liquid but containing only liquid defines a bag in a first configuration containing only liquid, i.e. the only fluid in the bag is substantially non-compressible liquid, e.g. water, anti-freeze, etc., the bag being capable of conforming to a second configuration of greater volume than the volume of the first configuration with negligible resistance. A plastic bag or balloon incompletely filled with water meets this criteria perfectly and unambiguously. The bag may, however, be of any convenient construction or configuration which meets the stated requirements. A resilient wall rubber or plastic bag or a fluted or folded plastic bag are quite suitable. In FIG. 2, for example, the reference reservoir is simply a flexible, non-resilient bag which is incompletely filled with liquid but contains only liquid, i.e. does not contain any gas, but is capable of expanding generally horizontally as well as vertically. In practice, virtually no vertical expansion occurs, however. The liquid conveniently used and which will be referred to hereinafter is water, but any liquid may be used. Liquids with a high coefficient of thermal expansion should be avoided for greatest accuracy. Liquids should be free of dissolved gases.

In the preferred embodiment, the variable-volume reference reservoir 12 is an accordion-fluted balloon-like structure, i.e. a resilient container having accordion-like fluted walls for easy expansion. If desired, the bulb may be constrained at its upper level and allowed to expand horizontally.

A housing 30 formed of an injection-molded plastic having walls such as indicated at 32 defining an upper chamber 34 and a lower chamber 36 divided by a wall 38 may be used. Actually, however, the size and configuration of the housing is not critical, and any housing may be used. Indeed, it is not necessary to use a housing, but it certainly is a convenient form of the invention.

Figure 3:
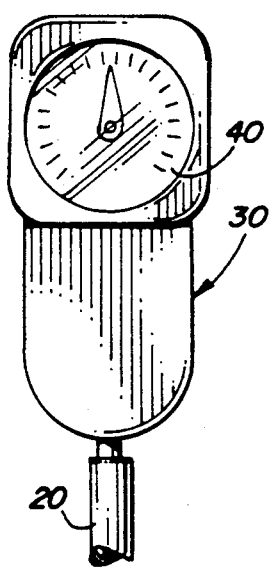
FIG. 3 is a front view of the housing holding the gauge and the sensing reservoir which is also depicted in FIG. 2, FIG. 3 being enlarged with respect to FIG. 2.

The housing 30 carries a gauge 40 which, as shown in FIG. 3, may have indicia on the gauge and will have a visual indicator of the pressure or force being exerted on the gauge.

The lower chamber 36 of the housing, in the preferred embodiment of the invention under discussion, constitutes a sensing reservoir. Also, in the preferred embodiment, a flexible-walled air container, such as a fluted balloon, shown at 50, is positioned and is connected by means of a conduit 52 in fluid communication with the pressure gauge 40. The sensing reservoir is connected through a conduit 54 and through the hose or other flexible conduit 20, thereby forming a fluid communication path.

It will also be noted, in reference to FIG. 1, that the hose may follow any path, such as over a beam B, without introducing errors in the measurement. This permits placement of the reference reservoir at any desired reference location and movement of the sensing reservoir to any location, with the hose running under or over objects, whether or not the reference reservoir is visible. For example, in health clubs and the like, multiple shower and dressing rooms are often tiled. The instrument of this invention permits the craftsman to assure that a line of tile is perfectly level throughout all rooms, thus avoiding the embarrassing circumstance of having a tile joint which is off-set vertically.

Figure 4:
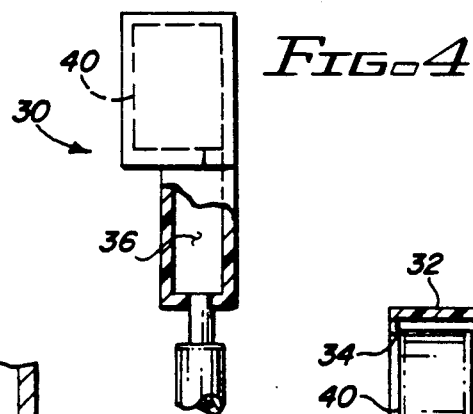
FIG. 4 depicts an alternative construction of the sensing reservoir of this invention interconnected with the gauge.

While it is preferable, for economy and accuracy, to provide the flexible-walled container 50 in the sensing reservoir 36, it is not necessary to do so. As shown in FIG. 4, the gauge 40 may be in fluid communication directly with the sensing reservoir 36. In either instance, the gauge 40 will measure the liquid head, i.e. the distance above or below the reference reservoir of the sensing reservoir. Stated differently, the gauge 40 will measure and indicate the weight of the water being supported by the reservoir 36 or the weight of water above the level of the constant-level sensing reservoir 36, if the sensing reservoir is below the reference reservoir.

Figure 5:
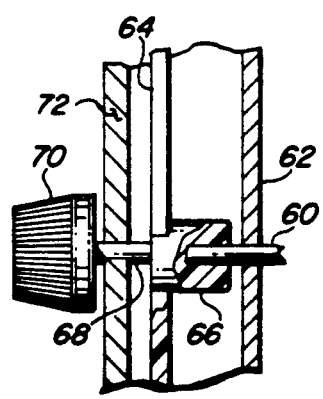
FIG. 5 depicts in schematic view a structure for adjusting the visual indicator on the gauge to zero, regardless of the actual pressure being applied to the gauge.

In some construction operations it may be desirable to establish a "zero" level or reference level and to assure that all similar structures are at exactly that zero level or at some predetermined distance above or below that zero level. It is, therefore, desirable to be able to "zero" the gauge regardless of the force or pressure being exerted upon the gauge. FIG. 5 depicts a simple mechanism for accomplishing this desired result. The shaft 60, which is connected to the pressure measuring device, extends through a wall or face plate 62 upon which the indicia may be formed. The visual indicator 64 is provided with a hub 66 having a hollow, cylindrical aperture therein which slips over the end of the shaft 60. The hub will cause the indicator to turn as the shaft turns, but will also permit the hub to turn relative to the shaft, thus permitting the indicator 64 to be moved to the zero position, thereby "zeroing" the gauge. The movement may be accomplished by a shaft 68 connected to a knob 70 on the outside of the gauge, the shaft extending through a glass or other transparent gauge cover 72.

Having described the basic features and structure of the invention, the various components will be discussed in somewhat greater detail. As previously noted, it is not necessary to provide an enclosed reference reservoir; all that is necessary is that the volume of liquid which may be held by the reservoir is variable. In a convenient embodiment, the reference reservoir is a rubber balloon or even a non-resilient plastic or polymeric bag which is held in a tray or container and is incompletely filled to define a first configuration, liquid, however, being the only fluid in the bag in said first configuration, there being no gas in the bag. The first configuration of the bag is such that additional liquid may flow into and out of the bag. It is important that the liquid in the reference reservoir be able to change in volume with negligible resistance; otherwise, the structure of the reference reservoir is insignificant.

The hose 20 may be of any conventional design. Many such hoses are available from any industrial supply house. A typical garden hose, small-diameter rubber, chlorinated rubber or other polymeric hose, or a high-pressure hose such as is used for filling pneumatic tires and the like may be used, for example.

The housing 30 may be made of metal or any other convenient material. Molded plastics are exceptionally convenient in forming housings of this type. The sensing reservoir 36 may be of any design which will assure that the weight of the water, or water head, is transmitted accurately to the gauge. The weight of the water or water head may be transmitted directly to the gauge, i.e. the gauge may be in continuous liquid communication with the reference reservoir, as depicted in FIG. 4. In the preferred embodiment, however, the weight of the water is transmitted by means of air or gas pressure differential, the gas pressure differential being a function of the expansion or contraction of the flexible-walled gas container 50 in the sensing reservoir. In the preferred embodiment a balloon-like structure is preferred but any other flexible-walled container which may be contained substantially entirely in the reference reservoir and which can expand or contract in volume with negligible resistance, may be used. A fluted rubber or plastic bag, for example, may be used.

The gauge 40 may be of any convenient construction or mode of operation. The conventional Bourdon tube pressure gauge, the diaphragm-type pressure gauge, etc., may be used. In all such pressure gauges it will be noted that there is a mechanical movement system which responds to differences in pressure which differences are transmitted via any of many various mechanical movements to an indicator. The indicator may, as depicted in FIG. 3, be a simple needle on the face of a gauge with numerical or other indicia thereupon, or it may be a digital or electronic display, or any other display. For simplicity and accuracy and convenience, the well-known DWYER ® gauge is highly accurate and is conveniently available through industrial supply houses. DWYER ® gauges are conveniently used in connection with the present invention. In a preferred embodiment, a 30 inch gauge (scale of 0 to 30 inches of water) manufactured by MARSHALTOWN, Hastings, Nebr., USA which uses a phosphor-bronze diaphragm has been found particularly satisfactory. It will also be noted that the movement of the mechanical components of the gauge make the use of the flexible-walled gas container unnecessary, since such movement can be accomplished by liquid filling of the gauge tube or diaphragm chamber, etc. It is difficult, however, to fill some gauge mechanisms fully with the liquid and, therefore, it is sometimes more convenient or more accurate to use a gas transmission mechanism such as the flexible-walled gas container which is in fluid communication with the gauge, rather than connecting the liquid directly to the gauge mechanism. Various types of indicating instruments, many of which are quite suitable for use in the present invention, are known in the prior art; see, for example, U.S. Pat. Nos. Re. 19,709 and 1,848,053.

It is also well known that many gauges have built-in "zeroing" mechanisms which work through clutches, gears, or other mechanisms to allow the calibration of the gauge in setting the indicator at zero. The adjusting mechanism depicted in FIG. 5 is provided simply for simplicity to illustrate the principal of operation and not necessarily to indicate a preferred mechanism of operation. Any gauge which can be calibrated may be used.

Returning to the mode of use, for further discussion, it will now be understood that the invention can be used in connection with a marking pencil or any other marker, to mark a line around a plurality of walls which will be perfectly level, or to mark particular points on walls in different rooms which will be perfectly level and will all be the same vertical distance above the floor or other reference point where the reference reservoir is located. By appropriate marking, the exact vertical location of windows, paint lines, wall boards, and other structures may be determined, and high accuracy and leveling achieved. In some plumbing insulations, it is desirable to maintain a high level of accuracy as to vertical height of various drain pipes and to assure proper sloping of the pipes. This invention may be used by plumbers for accomplishing these results.

In like manner, the invention may be used to position various structures at precisely known elevations that are different one from another. For example, if it is desired to position one window a precisely determined number of inches above another window, the instrument may be zeroed at the level of one window and then moved to the level of the other window, the level of the other window being determined by the reading on the gauge. The gauge indicia may be made to read in centimeters, inches, feet, etc. Most conveniently for most structural operations, the gauge will read in inches and in fractions of inches, in English and American construction.

William, U.S. Pat. No. 2,557,021, discloses systems which require a closed loop between the bottom and top of the reservoir and the gauge, an artificially applied positive pressure, or a thermal insulator jacket, which are subject to temperature errors for which Williams seeks a solution. The present invention overcomes the temperature error addressed by Williams in an entirely different manner, i.e. the bag contains no gas, only liquid.

Health, U.S. Pat. No. 2,587,998, discloses a leveling device which is simple in concept and reliable in operation, but is impractical for most industrial construction and other projects, because both the reference reservoir and the measuring tube are to the atmosphere, easily spilled, and require filling for use and emptying for transport or storage. In addition, the user always faces the very common circumstance that gas may come out of solution or otherwise be entrapped in the liquid. The presence of gas bubbles presents one or more, frequently a great many, compressible pockets which may block free-flow of liquid or prevent accurate measurement by effectively reducing the density of the liquid by interspersing small bubbles in the liquid and dissolving gas in the liquid.

The principal of the invention may be embodied in many structures, and many types of components may be assembled to accomplish the purpose of the invention without departing from the spirit of the invention. The invention is also embodied in a method of determining relative vertical differences or in assuring that two or more components are at the same level. In carrying out this method, a variable volume reference reservoir is positioned at any desired reference point from which other measurements are to be taken. The reference reservoir is in fluid communication with a sensing reservoir to which a gauge is connected for measuring the difference in vertical elevation of the sensing reservoir from the reference reservoir. The sensing reservoir is then moved to obtain a predetermined reading on the gauge, or to a predetermined point at which the gauge is set to read zero. By moving the reference reservoir to different points on a wall or upon different walls, exactly the same vertical elevation may be obtained by positioning the sensing reservoir to obtain a zero reading on the gauge. To obtain a different vertical elevation, the sensing reservoir is positioned to obtain a precisely known different reading on the gauge which positions the sensing reservoir a predetermined distance above or below the reference reservoir.

In summary, the instrument of this invention for assuring that plural vertical points are at the same level or at predetermined different levels comprises an entirely closed liquid system containing, as the only fluid, only substantially non-compressive liquid. The liquid system comprising a closed reference reservoir having a flexible bag containing only liquid, said liquid incompletely filling the bag to define a first configuration such that additional liquid may flow into the bag to define a second greater volume configuration and flow out of the bag to effect, with negligible resistance, a change in the volume of liquid in the bag, a sensing reservoir, and a flexible conduit having a first end and a second end for connecting said reservoirs in liquid communication with each other. The instrument includes means connecting the reference reservoir at the first end of and in fluid communication with the flexible conduit, means connecting the sensing reservoir at the second end of and in fluid communication with the flexible conduit, the flexible conduit, reference reservoir and sensing reservoir containing only said liquid and being in fluid communication with one another and the reference reservoir and conduit being constructed and configured to define a closed liquid-containing system. A closed fluid-pressure gauge having a visible pressure indicator and indicia for giving a visual quantitative indication of the pressure applied to the gauge and means connecting the fluid-pressure gauge with the sensing reservoir for communicating the pressure in the sensing reservoir to the gauge are a part of the invention. The fluid-pressure gauge and liquid-containing system are so connected, constructed and configured that the pressure measured by the pressure gauge is proportional to the vertical distance of the sensing reservoir above or below the reference reservoir. The means connecting the fluid-pressure gauge with the sensing reservoir for communicating the pressure in the sensing reservoir to the gauge may comprise a flexible-walled gas container in the sensing reservoir and means connecting the fluid-pressure gauge in fluid communication with flexible-walled gas container; the fluid-pressure gauge, flexible-walled gas container and liquid-containing system being so connected, constructed and configured that the pressure measured by the pressure gauge is the pressure of the gas in the gas container which is proportional to the vertical distance of the sensing reservoir above or below the reference reservoir. The invention is characterized in that the liquid system is entirely closed, i.e. the liquid cannot be spilled, and the system accuracy is dependent only upon the accuracy of the pressure gauge per se and not upon stretched membranes, bellows, diaphragms or like structures in which the extent of movement is a function of the resiliency of the material of construction and/or the degree of stretching, etc.

Many variations from that described as exemplary may be accomplished without departing from the spirit and scope of the invention.

INDUSTRIAL APPLICATION

This invention is useful in the building trades.

What is claimed is:

1. An instrument for assuring that plural vertical points are at predetermined levels with respect to each other, comprising:
   (a) an entirely closed liquid system containing, as the only fluid, only substantially non-compressive liquid, the liquid system comprising;
      (i) a reference reservoir comprising a flexible bag containing only said liquid, said liquid incompletely filling the bag to define a first configuration such that additional liquid may flow into the bag to define a second greater volume configuration and flow out of the bag to effect, with negligible resistance, a change in the volume of liquid in the bag, the bag being disposed and constructed so as to be capable of expanding generally horizontally to thereby expand contract with negligible resistance;
      (ii) a sensing reservoir; and
      (iii) a flexible conduit having a first end and a second end for connecting said reservoirs in liquid communication with each other;
      (iv) means connecting the reference reservoir at the first end of and in fluid communication with the flexible conduit;
      (v) means connecting the sensing reservoir at the second end of and in fluid communication with the flexible conduit; and
      (iv) the flexible conduit, reference reservoir and sensing reservoir containing only said liquid and being in fluid communication with one another;
   (b) a fluid-pressure gauge having a visible pressure indicator and indicia for giving a visual quantitative indication of the pressure applied to the gauge; and
   (c) means connecting the fluid-pressure gauge with the sensing reservoir for communicating the pressure in the sensing reservoir to the gauge;
the fluid-pressure gauge and liquid-containing system being so connected, constructed and configured that the pressure measured by the pressure gauge is proportional to the vertical distance of the sensing reservoir above or below the reference reservoir.

2. The instrument of claim 1 wherein said indicia includes a zero point, indicia indicating pressures above and below said zero point and means for adjusting the indicator to the zero point regardless of the actual pressure applied to the pressure gauge.

3. The instrument of claim 1 wherein the means connecting the fluid-pressure gauge with the sensing reservoir for communicating the pressure in the sensing reservoir to the gauge comprises:
   (i) a flexible-walled gas container in the sensing reservoir; and (ii) means connecting the fluid-pressure gauge in fluid communication with said flexible-walled gas container;

the fluid-pressure gauge, flexible-walled gas container and liquid-containing system being so connected, constructed and configured that the pressure measured by the pressure gauge is the pressure of the gas in the gas container which is proportional to the vertical distance of the sensing reservoir above or below the reference reservoir.

4. An instrument for assuring that plural vertical points are at predetermined levels with respect to each other, comprising:
 (a) an entirely closed liquid system containing, as the only fluid, only substantially non-compressive liquid, the liquid system comprising; (i) a reference reservoir comprising a flexible bag containing only said liquid, said liquid incompletely filling the bag to define a first configuration such that additional liquid may flow into the bag to define a second greater volume configuration and flow out of the bag to effect, with negligible resistance, a change in the volume of liquid in the bag; (ii) a sensing reservoir; and (iii) a flexible conduit having a first end and a second end for connecting said reservoirs in liquid communication with each other; (iv) means connecting the reference reservoir at the first end of and in fluid communication with the flexible conduit; (v) means connecting the sensing reservoir at the second end of and in fluid communication with the flexible conduit, the flexible conduit, reference reservoir and sensing reservoir containing only said liquid and being in fluid communication with one another;
 (b) a fluid-pressure gauge having a visible pressure indicator and indicia for giving a visual quantitative indication of the pressure applied to the gauge; and
 (c) means connecting the fluid-pressure gauge with the sensing reservoir for communicating the pressure in the sensing reservoir to the gauge; the means connecting the fluid-pressure gauge with the sensing reservoir for communicating the pressure in the sensing reservoir to the gauge comprising a flexible-walled gas container in the sensing reservoir; and means connecting the fluid-pressure gauge in fluid communication with said flexible-walled gas container; the fluid-pressure gauge, flexible-walled gas container and liquid-containing system being so connected, constructed and configured that the pressure measured by the pressure gauge is the pressure of the gas in the gas container which is proportional to the vertical distance of the sensing reservoir above or below the reference reservoir.

5. The instrument of claim 4 wherein the flexible-walled gas container is a polymeric bag incompletely filled with gas contained substantially entirely in the sensing reservoir.

6. A leveling instrument for assuring that plural vertical points are at the same level, comprising:
 (a) a fluid-pressure gauge having a diaphragm which is compressible from an expanded configuration to a compressed configuration;
 (b) an entirely closed liquid system containing, as the only fluid, only substantially non-compressive liquid, the liquid system comprising;
  (i) a reference reservoir comprising a flexible bag containing only said liquid, said liquid incompletely filling the bag to define a first configuration such that additional liquid may flow into the bag to define a second greater volume configuration and flow out of the bag to effect, with negligible resistance, a change in the volume of liquid in the bag, the bag being disposed and constructed so as to be capable of expanding generally horizontally to thereby expand contract with negligible resistance;
  (ii) a sensing reservoir; and
  (iii) a flexible conduit having a first end and a second end for connecting said reservoirs in liquid communication with each other;
  (iv) means connecting the reference reservoir at the first end of and in fluid communication with the flexible conduit;
  (v) means connecting the sensing reservoir at the second end of and in fluid communication with the flexible conduit; and
  (iv) the flexible conduit, reference reservoir and sensing reservoir containing only said liquid and being in fluid communication with one another;
 (c) means connecting the fluid-pressure gauge with the sensing reservoir for communicating the pressure in the sensing reservoir to the gauge;
the fluid-pressure gauge and liquid-containing system being so connected, constructed and configured that the pressure measured by the pressure gauge is proportional to the vertical distance of the sensing reservoir above or below the reference reservoir.

7. The leveling instrument of claim 6 wherein the means connecting the fluid-pressure gauge with the sensing reservoir for communicating the pressure in the sensing reservoir to the gauge comprises:
 (i) a flexible-walled gas container in the sensing reservoir; and
 (ii) means connecting the fluid-pressure gauge in fluid communication with said flexible-walled gas container;
the fluid-pressure gauge, flexible-walled gas container and liquid-containing system being so connected, constructed and configured that the pressure measured by the pressure gauge is the pressure of the gas in the gas container which is proportional to the vertical distance of the sensing reservoir above or below the reference reservoir.

8. The leveling instrument of claim 6 wherein the means connecting the fluid-pressure gauge with the sensing reservoir for communicating the pressure in the sensing reservoir to the gauge comprises:
 (i) a flexible-walled gas container in the sensing reservoir; and
 (ii) means connecting the fluid-pressure gauge in fluid communication with said flexible-walled gas container;
the fluid-pressure gauge, flexible-walled gas container and liquid-containing system being so connected, constructed and configured that the pressure measured by the pressure gauge is the pressure of the gas in the gas container which is proportional to the vertical distance of the sensing reservoir above or below the reference reservoir.

9. The leveling instrument of claim 8 wherein the flexible-walled gas container is a polymeric bag incompletely filled with gas contained substantially entirely in the sensing reservoir.

* * * * *